US010783547B2

(12) United States Patent
Liyanage (10) Patent No.: US 10,783,547 B2
(45) Date of Patent: Sep. 22, 2020

(54) APPROXIMATING UNIQUE ADVERTISEMENT IMPRESSIONS ON A SOCIAL NETWORKING SYSTEM

(75) Inventor: Janaka Liyanage, Panagoda (LK)

(73) Assignee: Facebook, Inc., Menlo Park, CA (US)

(*) Notice: Subject to any disclaimer, the term of this patent is extended or adjusted under 35 U.S.C. 154(b) by 1337 days.

(21) Appl. No.: 13/212,076

(22) Filed: Aug. 17, 2011

(65) Prior Publication Data

US 2013/0046615 A1 Feb. 21, 2013

(51) Int. Cl.
*G06Q 30/02* (2012.01)
(52) U.S. Cl.
CPC ............... *G06Q 30/0242* (2013.01)
(58) Field of Classification Search
None
See application file for complete search history.

(56) References Cited

U.S. PATENT DOCUMENTS

| | | | | |
|---|---|---|---|---|
| 5,848,396 | A * | 12/1998 | Gerace | 705/7.33 |
| 2007/0022032 | A1* | 1/2007 | Anderson et al. | 705/35 |
| 2008/0021781 | A1* | 1/2008 | Rosenberg | 705/14 |
| 2008/0162524 | A1* | 7/2008 | LaFrance-Linden | G06F 11/3409 |
| 2008/0281915 | A1* | 11/2008 | Elad et al. | 709/204 |
| 2009/0055915 | A1* | 2/2009 | Piliouras | 726/8 |
| 2009/0228327 | A1* | 9/2009 | Roy et al. | 705/10 |
| 2010/0306043 | A1* | 12/2010 | Lindsay et al. | 705/14.41 |
| 2011/0029319 | A1* | 2/2011 | Mills et al. | 705/2 |
| 2011/0119136 | A1* | 5/2011 | Eldreth et al. | 705/14.69 |
| 2011/0288907 | A1* | 11/2011 | Harvey et al. | 705/7.29 |
| 2011/0289078 | A1* | 11/2011 | Woodard et al. | 707/723 |
| 2012/0150645 | A1* | 6/2012 | Mandyam et al. | 705/14.54 |
| 2012/0163570 | A1* | 6/2012 | Bandak | 379/90.01 |

OTHER PUBLICATIONS

Richard D Gregory, David W Gibbons, Paul F Donald; Bird census and survey techniques, Chapter 2; May 12, 2004; Wallace Resource Library; p. 28, Fig. 2.5, also pp. 17-55.*
Munmun De Choudhury; How Does the Data Sampling Strategy Impact the Discovery of Information Diffusion in Social Media?; 2010; AAAi,org.*
Meenakshi Nagarajan, Monetizing User Activity on Social Networks—Challenges and Experiences, Sep. 2009, IEEE.*
J.M. DiMicco, People Sensemaking and Relationship Building on an Enterprise Social Network Site, Jan. 2009, IEEE.*

* cited by examiner

*Primary Examiner* — Arthur Duran
(74) *Attorney, Agent, or Firm* — Fenwick & West LLP (57) ABSTRACT

Unique user impressions of advertisements on a social networking system may be tracked and approximated by the social networking system. After an advertisement is delivered to a user, identifying information about the advertisement is associated with the user if the advertisement was not previously presented to the user. An impression count records the number of unique impressions of the advertisement by users of the social networking system up to a predetermined threshold. After the predetermined threshold is reached, the social networking system records a sampling of the unique impressions. Upon request for the number of unique impressions for an advertisement, the social networking system may extrapolate the recorded unique impressions based on the predetermined threshold. In one embodiment, a time degradation factor may be applied to the sampling rate so that recent impressions are sampled more than older impressions.

20 Claims, 4 Drawing Sheets

APPROXIMATING UNIQUE ADVERTISEMENT IMPRESSIONS ON A SOCIAL NETWORKING SYSTEM

BACKGROUND

This invention relates generally to social networking, and in particular to approximating unique advertisement impressions on a social networking system.

Traditional online advertising, such as display ads in banners and pop-up windows, have used tracking cookies embedded in web browsers to provide tracking information of potential customers to advertisers. For example, as a user browses the Internet from an initial web search, a tracking cookie may record information about advertisements displayed to the user. In this way, advertisers could estimate how many unique advertisement impressions, or unique user views, were achieved in an advertising campaign. However, this method of tracking users through embedded web browser cookies raises privacy concerns and does not scale for tracking hundreds of millions of users. Embedded tracking cookies also pose a security threat to users, leaving them vulnerable to malware attacks.

In recent years, users of social networking systems have shared their interests and engaged with other users of the social networking systems by sharing photos, real-time status updates, and playing social games. The amount of information gathered from users is staggering—information about news articles, videos, photos, and game achievements shared with other users of the social networking system. Advertisers may also create pages where this content may also be posted and shared with users of the social networking system. As a result, advertisements posted to a social networking system may become "viral" because user engagement with advertisements may be shared with other users of the social networking system. Social networking systems have lacked tools to measure the performance of an advertisement in terms of unique impressions. This information would provide valuable insight for advertisers in designing future advertising campaigns on the social networking systems.

SUMMARY

Unique user impressions of advertisements on a social networking system may be tracked and approximated by the social networking system. After an advertisement is delivered to a user, identifying information about the advertisement is associated with the user if the advertisement was not previously presented to the user. An impression count records the number of unique impressions of the advertisement by users of the social networking system up to a predetermined threshold. After the predetermined threshold is reached, the social networking system records a sampling of the unique impressions. Upon request for the number of unique impressions for an advertisement, the social networking system may extrapolate the recorded unique impressions based on the predetermined threshold. In one embodiment, a time degradation factor may be applied to the sampling rate so that recent impressions are sampled more than older impressions.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the social networking system. Users join the social networking system and add connections to a number of other users to whom they desire to be connected. Users of the social networking system can provide information describing them, which is stored as user profiles. For example, users can provide their age, gender, geographical location, education history, employment history and the like. The information provided by users may be used by the social networking system to direct information to the user. For example, the social networking system may recommend social groups, events, shared content items, and potential friends to a user. The social networking system may also use user profile information to direct advertisements to the user, ensuring that only relevant advertisements are directed to the user. Relevant advertisements ensure that advertising spending reaches their intended audiences, rather than wasting shrinking resources on users that are likely to ignore the advertisement.

In addition to declarative information provided by users, social networking systems may also record users' actions on the social networking system. These actions include communications with other users, sharing photos, interactions with applications that operate on the social networking system, such as a social gaming application, responding to a poll, adding an interest, and joining an employee network. A social networking system may also be able to capture external website data that is accessed by its users. This external website data may include websites that are frequently visited, links that are selected, and other browsing data. Information about users, such as stronger interests in particular users and applications than others based on their behavior, can be generated from these recorded actions through analysis and machine learning by the social networking system.

User generated content, such as photos, videos, textual status updates, links to websites and user actions within and outside of a social networking system, may be shared by users with other users of a social networking system. As a result, certain content items may be shared repeatedly among users of the social networking system. These "viral"

content items may include any type of user generated content as well as advertisements shared by users of the social networking system. Content items may become "viral" in the sense that users are more likely to be exposed to some content items rather than other content items. Advertisers, as users of a social networking system, may generate advertisements that include user generated content, such as a user's check-in at a Starbucks being elevated as a sponsored story that is paid for by an advertiser and delivered to one or more of the user's friends in the social networking system. Further, advertisements may also be shared as content items by users, and user interactions may also be shared with other users of the social networking system.

Significant resources may potentially be expended to organize the staggering amounts of data collected in tracking advertisement impressions on users of a social networking system. A social networking system having hundreds of millions of users, for example, gathers a staggering amount of information about its users. To address issues of scalability and efficiently expending computing resources, a social networking system may sample recordings of advertisement impressions.

Reliable information about the number of unique user impressions of advertisements is valuable to administrators of a social networking system because this information may be used, in one embodiment, to provide performance metrics information about advertisements to advertisers. Because some advertisements use social content, such as the ability for users to share, like, comment, and otherwise engage with advertisements, advertisers may use the performance metric of the number of unique user impressions to compare these advertisements to advertisements that do not include social content, such as a banner ad. Such information would provide advertisers with a better understanding of the return on investment (ROI) in social media advertising as well as performance metrics in brand penetration in a targeted demographic, for example. Further, the unique user impressions metric provides an incentive to advertisers to increase the number of fans, or users that have expressed interest in pages on the social networking system sponsored by advertisers.

Figure 1:
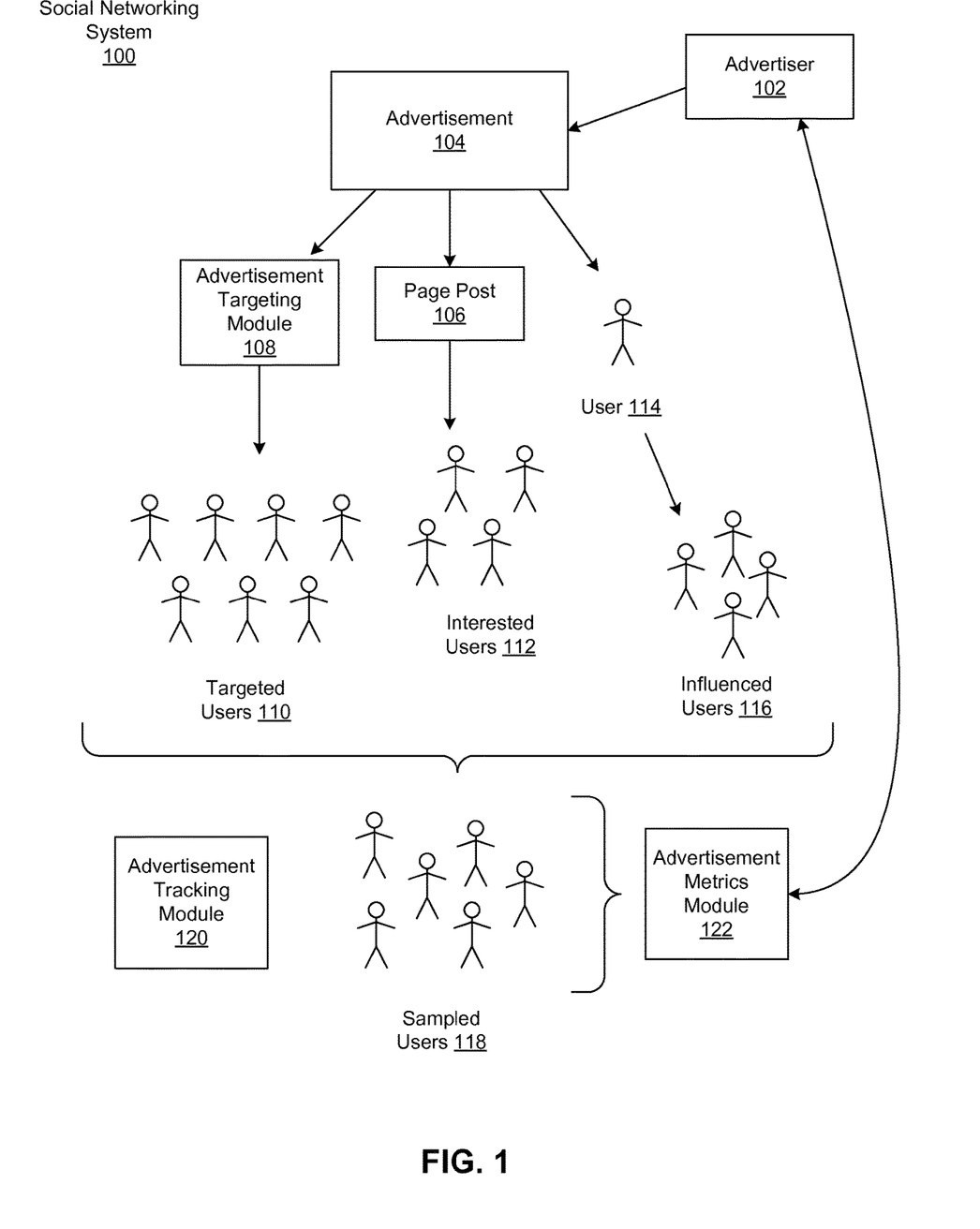
FIG. 1 is high-level block diagram illustrating a process of approximating unique advertisement impressions on users of a social networking system, in accordance with an embodiment of the invention.

FIG. 1 illustrates a high-level block diagram of a process for approximating unique advertisement impressions on users of a social networking system, in one embodiment. As illustrated in this diagram, an advertiser 102, which may be a user of a social networking system 100, may provide an advertisement 104 for distribution to other users of the social networking system 100. The advertisement 104 may be distributed in various communication channels on the social networking system 100, including as part of a page post 106. For example, the advertiser 102 may host a page on the social networking system 100 associated with a product that the advertiser 102 is marketing. The advertisement 104 may be embodied as a page post 106 that is shared with interested users 112 who have already expressed interest in the page hosted by the advertiser 102.

Additionally, the advertisement 104 may be distributed to users of the social networking system 100 through an advertisement targeting module 108 on the social networking system 100. The advertisement targeting module 108 uses targeting criteria specified by the advertiser 102, such as demographics, interests, location, and other profile information associated with users of the social networking system 100, in distributing advertisements to users. Through the advertisement targeting module 108, the advertisement 104 may be distributed to targeted users 110.

Users of the social networking system 100 may take actions using the social networking system 100 that are associated with one or more objects. Many different types of interactions may occur on a social networking system, including commenting on a photo album, communications between users, becoming a fan of a musician, and adding an event to a calendar. User may also perform actions with advertisements on the social networking system 100 as well as other applications operating on the social networking system 100. These actions may be published as communications in the social networking system 100 through different communication channels, including a feed, a page wall, and sponsored stories. A user 114 that has received an advertisement 104, in one embodiment, may interact with the advertisement 104 such that the advertisement 104 is further distributed to influenced users 116. The influenced users 116 may view the advertisement 104 in association with the user 114 engaging with the advertisement 104 in one of the above communication channels.

Through these communication channels of the social networking system 100, the advertisement 104 may be viewed by thousands of targeted users 110, interested users 112, and influenced users 116. Because of the complexity of the various distribution mechanisms, as well as considerations of scalability and user privacy, administrators of the social networking system 100 may sample the number of impressions for an advertisement using an advertisement tracking module 120. The advertisement tracking module 120 samples the targeted users 110, interested users 112, and influenced users 116 to identify a set of sampled users 118. From the set of sampled users 118, the advertisement tracking module 120 records advertisement impressions up to a predetermined threshold. After the predetermined threshold is reached, a sampling of the excess advertisement impressions is recorded for the advertisement 104.

An advertisement metrics module 122 analyzes the recorded impressions for the advertisement 104 upon a request for an approximation of the total number of unique impressions of the advertisement by the advertiser 102. The advertisement impressions in excess of the predetermined threshold may be extrapolated based on the sample rate by the advertisement metrics module 122. Further, the determined advertisement impressions for the sampled users 118 may be extrapolated to the total population, including the targeted users 110, interested users 112, and influenced users 116. As a result, the total number of unique impressions of the advertisement may be approximated by the advertisement metrics module 122 and reported to the advertiser 102.

System Architecture

Figure 2:
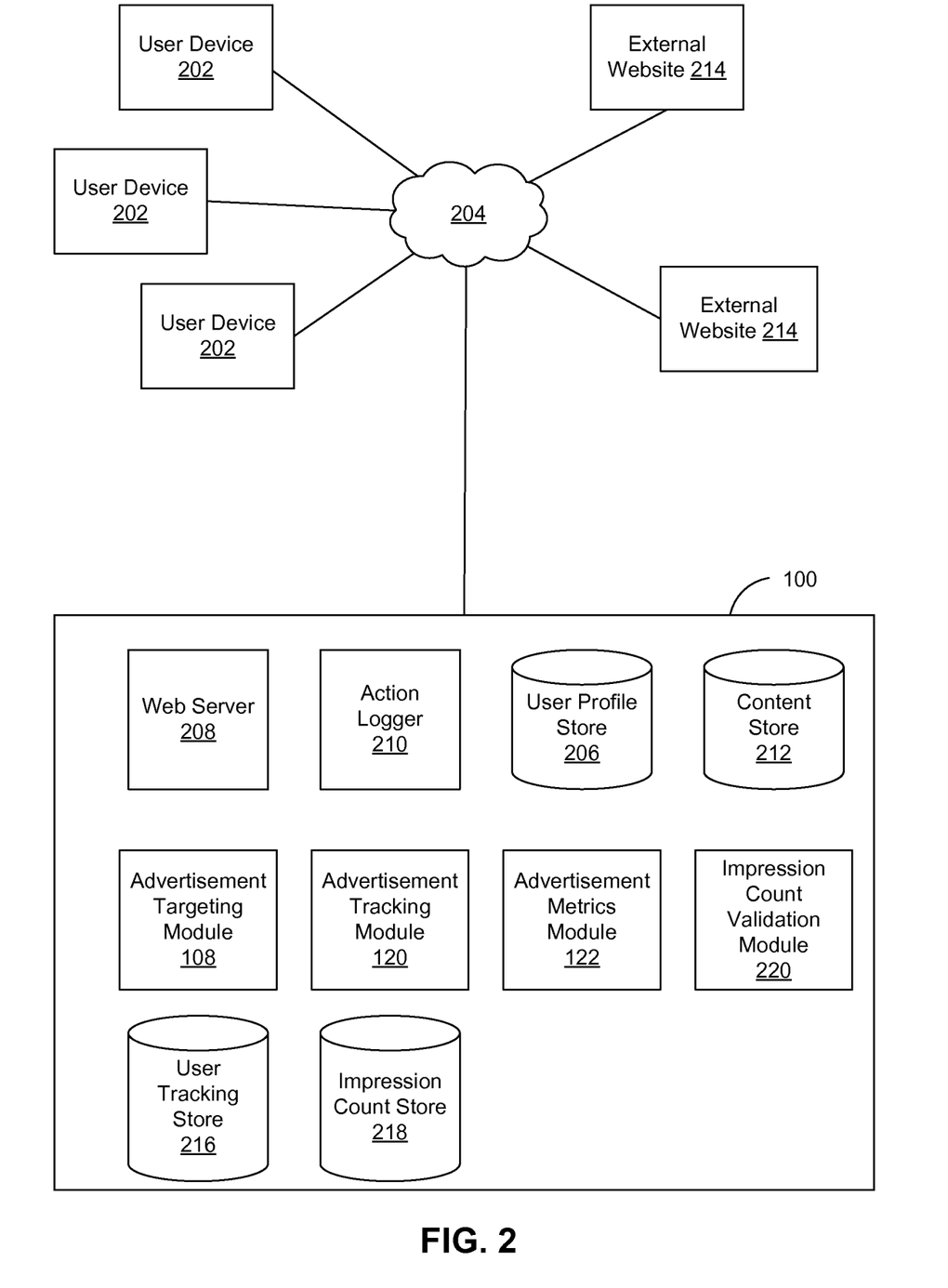
FIG. 2 is a network diagram of a system for approximating unique advertisement impressions on users of a social networking system, showing a block diagram of the social networking system, in accordance with an embodiment of the invention.

FIG. 2 is a high-level block diagram illustrating a system environment suitable for tracking effects of a communications propagated in a social networking system, in accordance with an embodiment of the invention. The system environment comprises one or more user devices 202, the social networking system 100, a network 204, and one or more external websites 214. In alternative configurations, different and/or additional modules can be included in the system.

The user devices 202 comprise one or more computing devices that can receive user input and can transmit and receive data via the network 204. In one embodiment, the user device 202 is a conventional computer system executing, for example, a Microsoft Windows-compatible operating system (OS), Apple OS X, and/or a Linux distribution. In another embodiment, the user device 202 can be a device having computer functionality, such as a personal digital assistant (PDA), mobile telephone, smart-phone, etc. The user device 202 is configured to communicate via network 204. The user device 202 can execute an application, for example, a browser application that allows a user of the user device 202 to interact with the social networking system 100. In another embodiment, the user device 202 interacts with the social networking system 100 through an application programming interface (API) that runs on the native operating system of the user device 202, such as iOS 4 and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a web server 208, an action logger 210, a content store 212, an advertisement targeting module 108, an advertisement tracking module 120, an advertisement metrics analysis module 122, a user tracking store 216, an impression count store 218, and an impression count validation module 220. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

The web server 208 links the social networking system 100 via the network 204 to one or more user devices 202; the web server 208 serves web pages, as well as other web-related content, such as Java, Flash, XML, and so forth. The web server 208 may provide the functionality of receiving and routing messages between the social networking system 100 and the user devices 202, for example, instant messages, queued messages (e.g., email), text and SMS (short message service) messages, or messages sent using any other suitable messaging technique. The user can send a request to the web server 208 to upload information, for example, images or videos that are stored in the content store 212. Additionally, the web server 208 may provide API functionality to send data directly to native user device operating systems, such as iOS, ANDROID, webOS, and RIM.

Advertisements may be stored as content objects in a content store 212 in the social networking system 100. Advertisements may be distributed directly to users using an advertisement targeting module 108 that directly targets users based on profile information stored in user profile objects associated with the users. The user profile objects are stored in a user profile store 206 on the social networking system. As advertisements are distributed to users of the social networking system 100, an action logger 210 records interactions of users with the advertisements. An advertisement tracking module 120 tracks a sampling of users that are presented with advertisements to approximate a number of unique advertisement impressions by recording advertisement impression counts in content objects associated with the advertisements. The advertisement metrics analysis module 122 may determine unique impressions for advertisements based on analysis of user profile objects and content objects for the advertisements in the social networking system 100. The advertisement metrics analysis module 122 may provide the unique impressions for an advertisement 104 in real-time to an advertiser 102 upon request by the advertiser 102. A user tracking store 216 is used by the advertisement tracking module 120 and the advertisement metrics module 122 in storing identifying information about the users that have seen each advertisement. An impression count store 218 includes a pre-computed impression count for each advertisement. An impression count validation module 220 determines a final count for each advertisement in the impression count store 218 and corrects any inconsistencies in impression counts for the advertisement.

The action logger 210 is capable of receiving communications from the web server 208 about user actions on and/or off the social networking system 100. The action logger 210 populates an action log with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well.

An action log may be used by a social networking system 100 to track users' actions on the social networking system 100 as well as external websites that communication information back to the social networking system 100. As mentioned above, users may interact with various objects on the social networking system 100, including commenting on posts, sharing links, and checking-in to physical locations via a mobile device. The action log may also include user actions on external websites. For example, an e-commerce website that primarily sells luxury shoes at bargain prices may recognize a user of a social networking system 100 through website plug-ins that enable the e-commerce website to identify the user. Because users of the social networking system 100 are uniquely identifiable, e-commerce websites, such as this luxury shoe reseller, may use the information about these users as they visit their websites. The action log records data about these users, including viewing histories, advertisements that were clicked on, purchasing activity, and buying patterns.

User account information and other related information for a user are stored in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. A user profile store 206 maintains profile information about users of the social networking system 100, such as age, gender, interests, geographic location, email addresses, credit card information, and other personalized information. The user profile store 206 also maintains references to the actions stored in the action log and performed on objects in the content store 212.

An advertisement targeting module 108 receives targeting criteria for advertisements and distributes the advertisements based on the targeting criteria. In a social networking system 100, various types of advertisements may be created, including a traditional banner advertisement with a selectable link to a page about the advertised product, a more engaging social advertisement that requests a user to perform an action in the social networking system 100 through the advertisement, and sponsored story advertisements in which advertisers pay for existing content items that describe user interactions with an advertised product to be highlighted to other users connected to the users performing the interactions. The advertisement targeting module 108, in one embodiment, receives a configuration for the type of advertisement being published. Advertisers may then view metrics based on the type of advertisement used, comparing advertisements that use social content, such as user-engaging advertisements and sponsored stories, with more traditional online display advertisements, such as banner ads.

An advertisement tracking module 120 tracks impressions for each advertisement that is presented to users of the social networking system. The advertisement tracking module 120 selects a sample of users to track for an advertisement during a specified advertisement window, or time period. For example, an advertisement for a new fragrance by Britney Spears may be presented to users in advance of the launch date and then periodically after the launch date. The advertisement tracking module 120 may select a sample of users in the social networking system 100 to track. The selection of the sampled users may be a random sampling of all users in the social networking system 100, in one embodiment. In another embodiment, the advertisement tracking module 120 may track a sample of users from users that have already expressed an interest in a page on the social networking system associated with the advertiser, such as the advertiser for Britney Spears. In yet another embodiment, the advertisement tracking module 120 may track a sample of users that fit the targeting criteria of the advertisement. In a further embodiment, the advertisement tracking module 120 may track a sample of users that have expressed an interest in a page on the social networking system associated with the advertiser, users that fit the targeting criteria of the advertisement, and a random sampling of the total user population of the social networking system.

The advertisement tracking module 120 then records unique impressions of the advertisement for the sampled users during the specified time period up to a predetermined threshold (e.g., 100). After the predetermined threshold has been reached, additional impressions may be sampled at a predetermined sampling rate (e.g., every 12th impression). In one embodiment, a time degradation factor may be applied to the predetermined sampling rate such that more recent impressions are sampled more and older impressions are sampled less. For example, impressions of an advertisement that were made only in the past 28 days are recorded. In one embodiment, a rolling window may be used to ensure that only recent impressions are recorded. This rolling window may be 28 days, 7 days, or 1 day, as an example. The sampling rate may be implemented by performing a modulo operation on a user identifier, in an embodiment. In this way, unique impressions may be tracked without sacrificing user privacy by embedding a cookie in the user's web browser, for example. Additionally, this method of tracking unique advertisement impressions scales to a large user base of hundreds of millions of users on a social networking system because impressions are sampled after the predetermined threshold is reached.

An advertisement metrics analysis module 122 determines a total number of unique impressions for a selected advertisement by extrapolating sampled impressions and sampled users. Upon request for a total number of unique advertisement impressions, in real-time, the advertisement metrics analysis module 122 may calculate the number of unique advertisement impressions based on the recorded impressions of the sampled users. If the recorded impressions exceed the predetermined threshold for the advertisement, then the excess recorded impressions may be extrapolated according to the sampling rate for that advertisement. After the recorded impressions are extrapolated, information about the sampled users, such as the percentage of the total user population that may be targeted or interested in the advertisement, is used to extrapolate the recorded impressions to the total user population on the social networking system. In another embodiment, the total number of unique advertisement impressions for an advertisement is precomputed and stored in the impression count store 218.

A user tracking store 216 may be used by the advertisement tracking module 120 for storing identifying information about users that have viewed each advertisement that is being tracked. The advertisement tracking module 120 may use the user tracking store 216 in storing impression counts and sampling impressions of advertisements. An impression count store 218 may be used by the advertisement metrics module 122 to compute an impression count for an advertisement. The impression count store 218 may be regularly updated by the advertisement metrics module 122. In one embodiment, the impression count for an advertisement is precomputed and stored in the impression count store 218. As a request for an impression count of an advertisement is received, the impression count store 218 is able to provide a good estimate of the most recent impression count of an advertisement. Precomputing the impression count for advertisements and storing them in the impression count store 218 provides faster access to impression counts because the calculations described herein have already been executed.

An impression count validation module 220 validates a unique impression count of an advertisement and corrects any errors found. An advertisement may be used in multiple ad campaigns having multiple ad groups. An ad group may be defined as a population of users to be targeted by an advertisement. In some instances, an ad campaign may have multiple ad groups, and in other instances, an ad campaign may only have one ad group. The advertisement tracking module 120 tracks advertisements for ad campaigns and ad groups. Because advertisements in ad campaigns may be sampled at a lower rate than ad groups, different calculations of impression counts may be computed for the same advertisement due to the higher sampling error. The impression count validation module 220 identifies inconsistent impression counts for an advertisement and corrects the impression count by selecting the impression count calculated for the ad group. This is because the ad group represents a finer granularity than the ad campaign.

Tracking Unique Advertisement Impressions

Figure 3:
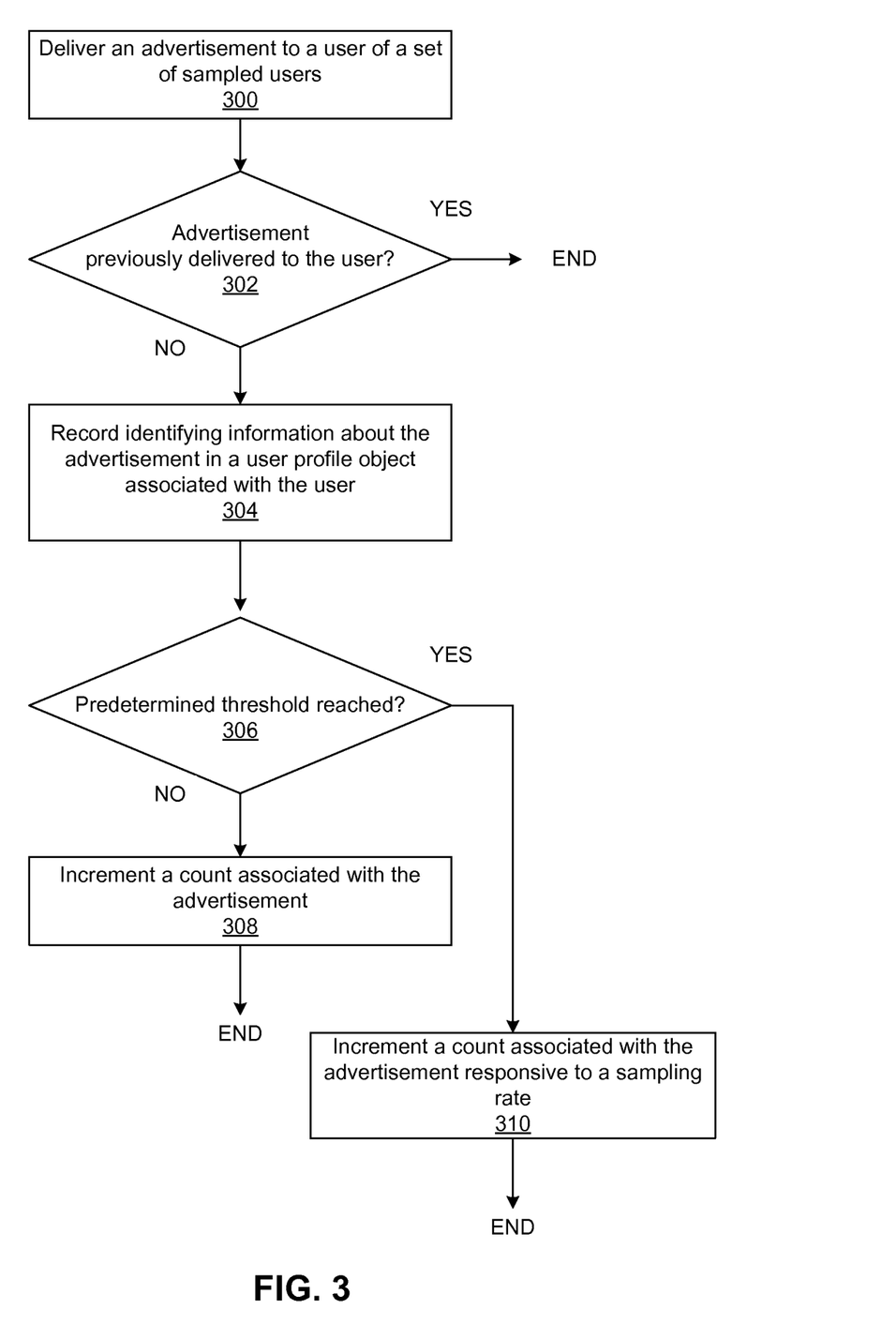
FIG. 3 is a flowchart of a process of recording an impression count for an advertisement delivered to users of a social networking system, in accordance with an embodiment of the invention.

FIG. 3 illustrates a flow chart diagram depicting a process of recording an impression count for an advertisement delivered to users of a social networking system, in accordance with an embodiment of the invention. An advertisement is delivered 300 to a user of a set of sampled users. The advertisement may have been targeted to the user by the advertisement targeting module 108, may have been shared by another user 114, or may have been shared to the user in the set of sampled users as part of a page post 106. The social networking system 100 then determines 302 whether the advertisement was previously delivered to the user. This may be discovered by searching a user profile object associated with the user for identifying information of the advertisement. If the advertisement has been previously delivered to the user, then the process ends. Otherwise, identifying information about the advertisement is recorded 304 in the user profile object associated with the user. In one embodiment, an advertisement identifier is recorded 304 in the user profile object associated with the user.

After identifying information about the advertisement has been recorded 304 in the user profile object for the user, a count of impressions associated with the advertisement is incremented 308 if it is determined 306 that the count has not reached a predetermined threshold. The count of impressions for an advertisement 104 is stored in a content object in the content store 212 associated with the advertisement 104, in one embodiment. In another embodiment, the count of impressions for an advertisement 104 is stored in the user tracking store 216. A predetermined threshold of impressions may also be stored in the content object for the advertisement 104, in an embodiment. The predetermined threshold may vary depending on the intended distribution of the advertisement 104. For example, an advertisement with a large daily advertising budget may be intended to be distributed to hundreds of thousands of users a day. In contrast, an advertisement with a small budget may only be intended to be distributed to a few hundred users a day. In another embodiment, the predetermined threshold of impressions is determined by administrators of the social networking system for each advertisement based on previous advertisement campaigns and impressions.

If it is determined 306 that the count associated with the advertisement 104 has reached the predetermined threshold, then the count is incremented 310 responsive to a sampling rate. A sampling rate may be predetermined by administrators of the social networking system 100 for the advertisement 104. The sampling rate may be expressed as a fraction, in one embodiment. In another embodiment, the sampling rate may be determined as a recurring action, such as incrementing the count every 12th impression after the predetermined threshold has been reached. In a further embodiment, an intermediary impression count maintained in the user tracking store 216 may be incremented according to the sampling rate.

Approximating Unique Advertisement Impressions

Figure 4:
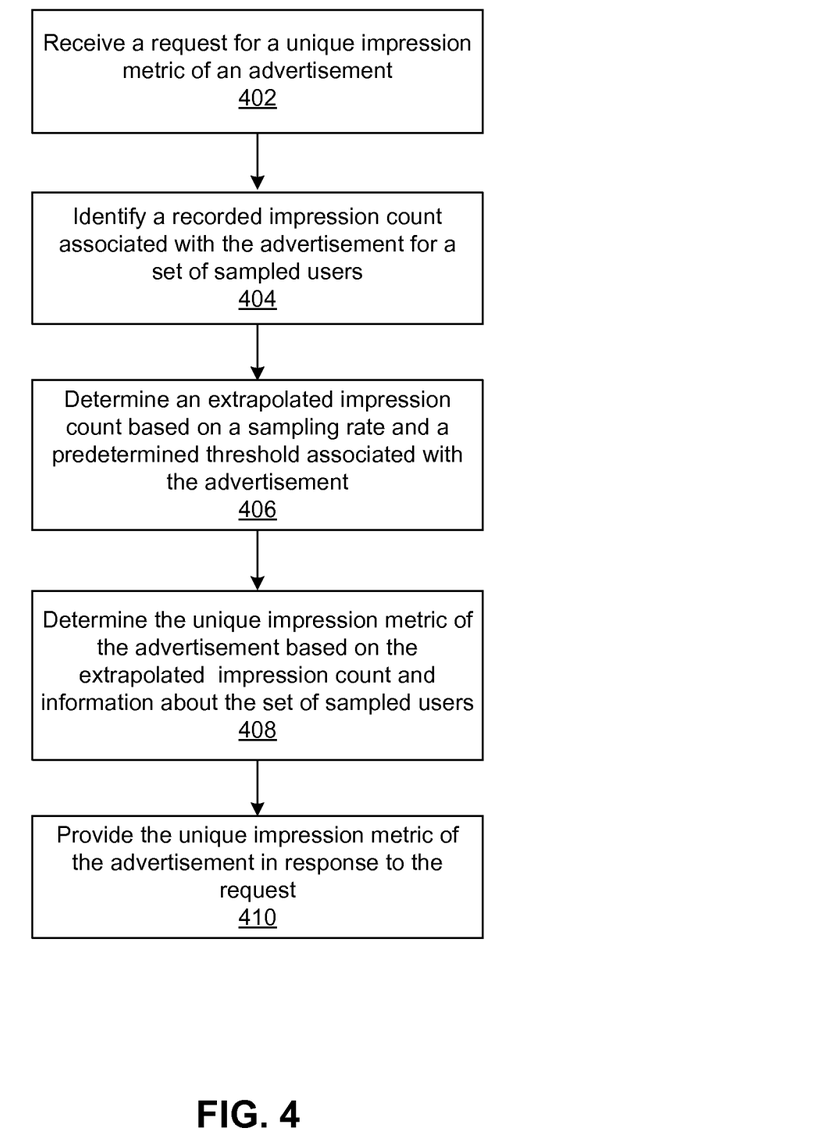
FIG. 4 is a flowchart of a process of providing an approximate impression count for an advertisement provided to users of a social networking system, in accordance with an embodiment of the invention.

FIG. 4 is a flowchart diagram depicting a process of providing an approximate impression count for an advertisement provided to users of a social networking system, in accordance with an embodiment of the invention. A request for a unique impression metric of an advertisement is received 402 by the social networking system 100 from an advertiser 102. The request may be received 402 by the social networking system 100 as an application programming interface (API) call, in one embodiment. In another embodiment, an advertiser 102 may request the unique impression metric of an advertisement through a user interface in the social networking system 100.

In one embodiment, a precomputed impression count for the advertisement may be retrieved from the impression count store 218 and provided 410 as the unique impression metric of the advertisement in response to the request, skipping steps 404 thru 408. If the precomputed impression count for the advertisement relies on impression information that is older than a predetermined time period, such as 28 days, then a new impression count may be computed. In one embodiment, the precomputed impression count may be validated using the impression count validation module 220 before being provided 410 as the unique impression metric of the advertisement in response to the request.

After a request for a unique impression metric for an advertisement is received 402, a recorded impression count associated with the advertisement for a set of sampled users is identified 404. The recorded impression count may be stored in a content object associated with the advertisement in the content store 212. The recorded impression count may be identified 404 by searching for the content object associated with the advertisement in the content store 212 and retrieving the stored recorded impression count. The set of sampled users may also be identified in the content object associated with the advertisement.

Once the recorded impression count is identified 404, an extrapolated impression count is determined 406 based on a sampling rate and a predetermined threshold associated with the advertisement. For example, if the recorded impression count for an advertisement is 250 impressions, the predetermined threshold for the advertisement is 150 impressions, and the sampling rate is to record every 10th impression after the predetermined threshold has been reached, then the extrapolated impression count is the first 150 impressions added to 10 times the remaining 100 impressions, totaling 1150 impressions. This is the extrapolated impressions for the set of sampled users for the advertisement.

After the extrapolated impression count is determined 406, the unique impression metric of the advertisement is determined based on the extrapolated impression count and the set of sampled users. Returning to the example above, suppose that the set of sampled users represented 10% of the total population of users that may have been targeted, influenced, or interested in the ad. The social networking system 100 may then determine that the unique impression metric of the advertisement is 11,500 impressions in this example because 1150 impressions were extrapolated based on the recorded impressions on the set of sampled users. In another embodiment, the set of sampled users may be determined according to a user sampling rate, such as every 16th user being sampled. In that case, the unique impression metric of the advertisement may be determined 408 by multiplying the extrapolated impression count with the inverse of the sampling rate.

The determined unique impression metric of the advertisement may then be provided 410 in response to the request. In one embodiment, the unique impression metric of the advertisement may be provided 410 in a user interface on the social networking system 100 for the advertiser 102 associated with the ad. In another embodiment, the unique impression metric of the advertisement may be provided 410 in response to an API call that includes the request for the unique impression metric.

Uses of Unique Impression Metrics for Advertisements on a Social Networking System Administrators of the social networking system may use the unique impression metrics of advertisements to generate various pricing models, advertisement campaign visualizations, and return on investment calculators that may help advertisers understand the effectiveness of the advertisements. In one embodiment, unique impressions for an advertisement may be broken down based on demographic information of the set of sampled users. This information may be used to vary pricing according to intended demographic versus actual impressions on the intended demographic. In another embodiment, advertisements that are part of the same advertisement campaign may be compared against each other. Advertisements that include a social context, such as advertisements that were shared with other users, check-in events associated with an advertiser, and expressions of interest in a page owned by an advertiser ("page likes"), may be compared against advertisements without a social context, such as banner ads, by determining the unique advertisement impressions for the advertisements. Various visualizations may be provided to advertisers that use the approximated unique user impressions for advertisements on a social networking system.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
providing an online advertisement to a plurality of users of an online social networking system;
determining, by a processor, a predetermined threshold number of unique user impressions for the online advertisement;
recording, by the processor, an impression count of unique user impressions of the online advertisement for a subset of the plurality of users of the online social networking system, the recorded impression count comprising:
an unsampled count comprising the predetermined threshold number of unique user impressions; and
a sampled count of unique user impressions comprising a number of unique user impressions greater than the predetermined threshold number of unique user impressions, the sampled count determined using a sampling rate associated with the online advertisement;
determining, by the processor, an extrapolated impression count based on the sampling rate, the predetermined threshold number of unique user impressions, and the recorded impression count of unique user impressions;
receiving, by the processor, a request for a unique impression metric for the online advertisement, the unique impression metric representing an approximation of unique user views for the plurality of users of the online social networking system;
calculating in real-time, by the processor, the unique impression metric for the online advertisement based on the extrapolated impression count, and information about a percent of users in the subset of a total number of the plurality of users of the online social networking system;
providing, in real-time, by the processor, the unique impression metric for the online advertisement in response to the request; and
displaying online in real-time the unique impression metric for the online advertisement.

2. The method of claim 1, wherein providing the online advertisement to the plurality of users of the online social networking system comprises:
providing the online advertisement to the plurality of users of the online social networking system during an advertisement window comprising a predetermined time period associated with the online advertisement.

3. The method of claim 1, wherein recording, by the processor, the impression count of unique user impressions of the online advertisement for the subset of the plurality of users comprises:
retrieving a count of unique user impressions of the online advertisement provided to the subset of the plurality of users of the online social networking system;
responsive to the count reaching the predetermined threshold number of unique user impressions, incrementing the sampled count according to the sampling rate for each unique impression of the online advertisement provided to a user of the subset of the plurality of users; and storing the sum of the unsampled count and the sampled count as the recorded impression count of unique user impressions.

4. The method of claim 1, wherein the subset of the plurality of users of the online social networking system comprises a random sampling of the plurality of users of the online social networking system.

5. The method of claim 1, wherein information about the the percent of users in the subset of the total number of the plurality of the users includes a ratio of the subset of the plurality of users and the plurality of users.

6. The method of claim 1, wherein information about the percent of users in the subset of a total number of the subset of the plurality of users comprises a percentage of targeted users of the social networking system for the online advertisement.

7. The method of claim 1, wherein information about the the percent of users in the subset of the total number of the plurality of users comprises a percentage of interested users of the social networking system for the online advertisement.

8. The method of claim 1, wherein the sampling rate includes a time degradation factor applied to unique user impressions of the online advertisement.

9. The method of claim 1, wherein providing, in real-time, by the processor, the unique impression metric of the online advertisement in response to the request further comprises:
providing breakdowns of the unique impression metric of the online advertisement, the breakdowns describing the unique user impressions of the online advertisement through a plurality of communication channels.

10. The method of claim 1, wherein recording, by the processor, the impression count of unique user impressions of the online advertisement for the subset of the plurality of users comprises:
retrieving a count of unique user impressions of the online advertisement provided to the subset of the plurality of users of the online social networking system;
responsive to the count being below the predetermined threshold number of unique user impressions, incrementing the unsampled count for each unique impression of the online advertisement provided to a user of the subset of the plurality of users;
storing the sum of the unsampled count and the sampled count as the recorded impression count of unique user impressions.

11. A non-transitory computer-readable storage medium storing instructions, the instructions when executed causing a processor to perform steps comprising:
providing an online advertisement to a plurality of users of an online social networking system;
determining, by a processor, a predetermined threshold number of unique user impressions for the online advertisement;
recording, by the processor, an impression count of unique user impressions of the online advertisement for a subset of the plurality of users of the online social networking system, the recorded impression count comprising:
an unsampled count comprising the predetermined threshold number of unique user impressions; and
a sampled count of unique user impressions comprising a number of unique user impressions greater than the predetermined threshold number of unique user impressions, the sampled count determined using a sampling rate associated with the online advertisement;

determining, by the processor, an extrapolated impression count based on the sampling rate, the predetermined threshold number of unique user impressions, and the recorded impression count of unique user impressions;
receiving, by the processor, a request for a unique impression metric for the online advertisement, the unique impression metric representing an approximation of unique user views for the plurality of users of the online social networking system;
calculating in real-time, by the processor, the unique impression metric for the online advertisement based on the extrapolated impression count, and information about a percent of users in the subset of a total number of the plurality of users of the online social networking system;
providing, in real-time, by the processor, the unique impression metric for the online advertisement in response to the request; and
displaying online in real-time the unique impression metric for the online advertisement.

12. The non-transitory computer-readable storage medium of claim 11, wherein providing the online advertisement to the plurality of users of the online social networking system comprises:
providing the online advertisement to the plurality of users of the online social networking system during an advertisement window comprising a predetermined time period associated with the online advertisement.

13. The non-transitory computer-readable storage medium of claim 11, wherein recording, by the processor, the impression count of unique user impressions of the online advertisement for the subset of the plurality of users comprises:
retrieving a count of unique user impressions of the online advertisement provided to the subset of the plurality of users of the online social networking system;
responsive to the count reaching the predetermined threshold number of unique user impressions, incrementing the sampled count according to the sampling rate for each unique impression of the online advertisement provided to a user of the subset of the plurality of users; and
storing the sum of the unsampled count and the sampled count as the recorded impression count of unique user impressions.

14. The non-transitory computer-readable storage medium of claim 11, wherein the subset of the plurality of users of the online social networking system comprises a random sampling of the plurality of users of the online social networking system.

15. The non-transitory computer-readable storage medium of claim 11, wherein information about the percent of users in the subset of the total number of the plurality of the users includes a ratio of the subset of the plurality of users and the plurality of users.

16. The non-transitory computer-readable storage medium of claim 11, wherein information about the of percent of users in the subset of the total number of the plurality of users comprises a percentage of targeted users of the social networking system for the advertisement.

17. The non-transitory computer-readable storage medium of claim 11, wherein information about the percent of users in the subset of the total number of the plurality of users comprises a percentage of interested users of the social networking system for the advertisement.

18. The non-transitory computer-readable storage medium of claim 11, wherein the sampling rate includes a time degradation factor applied to unique user impressions of the online advertisement.

19. The non-transitory computer-readable storage medium of claim 11, wherein providing, in real-time, by the processor, the unique impression metric of the online advertisement in response to the request further comprises:
 providing breakdowns of the unique impression metric of the online advertisement, the breakdowns describing the unique user impressions of the online advertisement through a plurality of communication channels.

20. The non-transitory computer-readable storage medium of claim 11, wherein recording, by the processor, the impression count of unique user impressions of the online advertisement for the subset of the plurality of users comprises:
 retrieving a count of unique user impressions of the online advertisement provided to the subset of the plurality of users of the online social networking system;
 responsive to the count being below the predetermined threshold number of unique user impressions, incrementing the unsampled count for each unique impression of the online advertisement provided to a user of the subset of the plurality of users; and
 storing the sum of the unsampled count and the sampled count as the recorded impression count of unique user impressions.

\* \* \* \* \*

UNITED STATES PATENT AND TRADEMARK OFFICE
CERTIFICATE OF CORRECTION

PATENT NO. : 10,783,547 B2
APPLICATION NO. : 13/212076
DATED : September 22, 2020
INVENTOR(S) : Janaka Liyanage Page 1 of 1

It is certified that error appears in the above-identified patent and that said Letters Patent is hereby corrected as shown below:

In the Claims

Column 13, Lines 8-9, Claim 5, delete "the the" and insert -- the --.

Column 13, Lines 17-18, Claim 7, delete "the the" and insert -- the --.

Column 14, Line 59, Claim 16, delete "the of" and insert -- the --.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*